US012513354B2

United States Patent
Su et al.

(10) Patent No.: US 12,513,354 B2
(45) Date of Patent: Dec. 30, 2025

(54) ONBOARD SCREEN CASTING SYSTEM AND METHOD

(71) Applicant: FAURECIA CLARION ELECTRONICS (XIAMEN) CO., LTD., Xiamen (CN)

(72) Inventors: Qingyang Su, Xiamen (CN); Youxiang Tu, Xiamen (CN)

(73) Assignee: FAURECIA CLARION ELECTRONICS (XIAMEN) CO., LTD., Xiamen (CN)

( * ) Notice: Subject to any disclaimer, the term of this patent is extended or adjusted under 35 U.S.C. 154(b) by 124 days.

(21) Appl. No.: 18/525,669

(22) Filed: Nov. 30, 2023

(65) Prior Publication Data

US 2024/0179365 A1     May 30, 2024

(30) Foreign Application Priority Data

Nov. 30, 2022   (CN) .......................... 202211524836.2

(51) Int. Cl.
*H04N 21/431*  (2011.01)
*H04N 21/4363*  (2011.01)

(52) U.S. Cl.
CPC ..... *H04N 21/4312* (2013.01); *H04N 21/4318* (2013.01); *H04N 21/4363* (2013.01)

(58) Field of Classification Search
CPC ........... H04N 21/4312; H04N 21/4318; H04N 21/4363
See application file for complete search history.

(56) References Cited

U.S. PATENT DOCUMENTS

| | | | | |
|---|---|---|---|---|
| 6,353,444 B1* | 3/2002 | Katta | ............... | H04N 21/42204 |
| | | | | 715/810 |
| 7,613,790 B2* | 11/2009 | Slothouber | ........ | H04N 21/8543 |
| | | | | 709/219 |
| 7,995,903 B2* | 8/2011 | Kato | ............... | H04N 21/47214 |
| | | | | 725/50 |
| 10,832,699 B1* | 11/2020 | McFarland, Jr. | ..... | G06F 16/487 |
| 11,666,823 B1* | 6/2023 | Gangwal | ............ | H04N 21/2187 |
| | | | | 463/31 |
| 11,695,993 B1* | 7/2023 | Matthews | ........ | H04N 21/26283 |
| | | | | 725/43 |
| 12,002,309 B2* | 6/2024 | Simoudis | ............... | G07C 5/008 |
| 2004/0226043 A1* | 11/2004 | Mettu | ............... | H04N 21/25841 |
| | | | | 348/E7.071 |
| 2005/0138659 A1* | 6/2005 | Boccon-Gibod | ........ | H04N 5/76 |
| | | | | 725/35 |
| 2007/0126884 A1* | 6/2007 | Xu | ........................ | H04N 21/433 |
| | | | | 348/E5.127 |
| 2007/0157247 A1* | 7/2007 | Cordray | ................. | G06Q 30/02 |
| | | | | 348/E5.006 |

(Continued)

*Primary Examiner* — Michael B. Pierorazio
(74) *Attorney, Agent, or Firm* — Kilpatrick Townsend & Stockton LLP

(57) ABSTRACT

The present disclosure provides an onboard screen casting system, an onboard screen casting method, and a computer-readable storage medium. The onboard screen casting system includes a host system and a virtual machine system; wherein, the virtual machine system is able to receive external bit stream data to be cast and transmit it to the host system; and the host system is able to decode the bit stream data into video stream data, and perform a visibility setting on the video stream data, to display the corresponding video.

12 Claims, 4 Drawing Sheets

(56) References Cited

U.S. PATENT DOCUMENTS

| | | | |
|---|---|---|---|
| 2007/0157260 A1* | 7/2007 | Walker | H04N 21/47214 725/86 |
| 2007/0174862 A1* | 7/2007 | Kushida | H04N 21/47 725/15 |
| 2007/0276690 A1* | 11/2007 | Ohtani | H04H 60/65 348/E5.002 |
| 2009/0172757 A1* | 7/2009 | Aldrey | H04N 7/173 725/110 |
| 2009/0217324 A1* | 8/2009 | Massimi | H04H 60/46 725/9 |
| 2011/0047568 A1* | 2/2011 | Yeh | H04N 21/6125 725/38 |
| 2011/0069940 A1* | 3/2011 | Shimy | H04N 21/42201 386/296 |
| 2011/0070819 A1* | 3/2011 | Shimy | H04H 60/52 707/E17.014 |
| 2011/0072452 A1* | 3/2011 | Shimy | H04N 21/44218 725/25 |
| 2011/0247036 A1* | 10/2011 | Adimatyam | H04N 21/4755 725/87 |
| 2011/0283320 A1* | 11/2011 | Levin | H04N 21/252 725/40 |
| 2011/0314502 A1* | 12/2011 | Levy | H04N 21/4532 725/46 |
| 2012/0054634 A1* | 3/2012 | Stone | G06F 16/9577 715/745 |
| 2012/0233552 A1* | 9/2012 | Chee | H04L 12/2814 715/745 |
| 2020/0356388 A1* | 11/2020 | Holt | G06F 9/451 |
| 2021/0092462 A1* | 3/2021 | Cox | H04N 21/23439 |
| 2022/0172638 A1* | 6/2022 | Aharonson | G09B 15/00 |
| 2022/0172639 A1* | 6/2022 | Aharonson | H04R 1/406 |
| 2022/0180766 A1* | 6/2022 | Aharonson | G09B 15/00 |
| 2022/0180767 A1* | 6/2022 | Aharonson | G10G 3/04 |
| 2022/0210610 A1* | 6/2022 | Geltz | H04W 4/029 |
| 2023/0094234 A1* | 3/2023 | Roessel | H04N 19/20 375/240.02 |
| 2023/0179840 A1* | 6/2023 | Novack | H04N 21/42201 725/37 |
| 2023/0217086 A1* | 7/2023 | Beilis-Lev | H04N 21/262 725/109 |
| 2024/0022867 A1* | 1/2024 | McCoy | H04N 21/8146 |
| 2024/0056625 A1* | 2/2024 | Goldmann | G06F 15/17 |
| 2024/0121453 A1* | 4/2024 | Roessel | H04N 19/20 |

* cited by examiner

ONBOARD SCREEN CASTING SYSTEM AND METHOD

FIELD

The present disclosure relates to onboard screen casting technology, in particular to an onboard screen casting system, an onboard screen casting method, and a computer-readable storage medium.

BACKGROUND

Currently, support for smartphone integrated systems has become one of the most important features on new cars in the current market. Smartphone integration systems, such as Google's Android Auto and Apple CarPlay, allow users to access basic functions of their phone through the car's infotainment system.

With the development of technology, users have higher and higher requirements for real-time operation response. In an existing solution, an onboard host is developed based on a virtual machine monitor (hypervisor) to realize the functions of smartphone integrated systems such as Android Auto and Carplay. However, the hypervisor-based host runs multiple operating systems, and each operating system has a need for displaying and video encoding and decoding, and a casting layer itself used to display the video on the host system is set in a virtual machine (guest) system, and if the cast video on the host system needs to display the cast video on the host system, it needs to transmit the decoded video stream to the virtual machine (guest) system, and then virtually display on the cast layer of layers managed by the virtual machine (guest) system, and finally transmit back to the host system for displaying the cast video on the onboard host.

Therefore, architecture based on the existing solution will cause the video to be transmitted multiple times between the host system and the guest system, resulting in huge screen cast delay and resource waste.

In order to overcome the defects of the existing solution, an onboard screen casting system is urgently needed in the field, which can reduce transmitting times of the data flow of the video to be cast between the host system and the virtual machine system without adding additional hardware equipment, to greatly reduce the screen casting delay.

SUMMARY

A brief overview of embodiments is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to overcome the defects of the existing technology, the present disclosure provides an onboard screen casting system according to the first aspect of the disclosure comprising: a host system; and a virtual machine system; wherein, the virtual machine system is able to receive external bit stream data to be cast and transmit it to the host system; and the host system is able to decode the bit stream data into video stream data, and perform a visibility setting on the video stream data, to display the corresponding video. By employing the casting system, transmitting times of the data flow of the video to be cast between the host system and the virtual machine system are reduced, greatly reducing the screen casting delay, without adding additional hardware equipment.

Further, in some embodiments of the present disclosure, the host system comprises a display management module, and the display management module comprises a host system layer and a virtual machine system layer, wherein the host system comprises a screen casting layer, and the screen casting layer is located below the virtual machine system layer, wherein, the host system is able to perform the visibility setting on the video stream data on the screen casting layer, to display the video on the screen casting layer.

Further, in some embodiments of the present disclosure, the virtual machine system layer comprises at least one application layer, wherein, the rest of layers other than the screen casting layer are set to be in a transparent state, and the screen casting layer is in a visible state, to display the video on the screen casting layer, or the at least one application layer is set to be in a non-transparent state, and the screen casting layer is in an invisible state, to display an application screen on the at least one application layer.

Further, in some embodiments of the present disclosure, the at least one application layer comprises application layers, wherein, one part of the application layers is set to be in the non-transparent state, to display the application screen on the application layer in the non-transparent state, and the other part of the application layers is set to be in the transparent state, to display the video on the screen casting layer on the application layer in the transparent state.

Further, in some embodiments of the present disclosure, the host system is further able to merge the screen casting layer and the at least one application layer, and set position and corresponding relations in the merged layer, to adjust the size of the screen casting layer.

Further, in some embodiments of the present disclosure, the host system comprises a video decoding module, and the video decoding module is able to perform visibility settings on each pixel of the video stream data, to perform visibility setting processing on the video stream data.

Further, in some embodiments of the present disclosure, the host system is able to stretch and/or cut the video stream data in the video decoding module.

Further, in some embodiments of the present disclosure, the onboard screen casting system further comprises a first display module, wherein the first display module is set in the host system, to at least display the video.

Further, in some embodiments of the present disclosure, the onboard screen casting system further comprises a second display module, wherein the second display module is set to be in the virtual machine system, to at least display the application screen on the at least one application layer.

Further, in some embodiments of the present disclosure, the onboard screen casting system further comprises a screen casting module set in the virtual machine system and at least one decoding module set in the host system, wherein the screen casting module is able to receive the bit stream data to be cast from an external device and transmit the bit stream data to be cast to the at least one decoding module.

In addition, an onboard screen casting provided according to the second aspect of the present disclosure includes the followings steps: receiving an external bit stream data to be cast via a virtual machine system and transmitting it to a host system; and decoding the bit stream data into a video stream data via the host system, and performing a visibility setting on the video stream data, to display a corresponding video. By employing the casting method, transmitting times of the data flow of the video to be cast between the host system and the virtual machine system are reduced, greatly reducing the screen casting delay, without adding additional hardware equipment.

In addition, the computer-readable storage medium provided according to the third aspect of the present disclosure, in which computer instructions are stored. When the computer instructions are executed by a processor, the casting method in the second aspect of the present disclosure is implemented. By employing the casting method, the storage medium is able to reduce transmitting times of the data flow of the video to be cast between the host system and the virtual machine system, greatly reducing the screen casting delay, without adding additional hardware equipment.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

REFERENCE NUMBER

Figure 1:
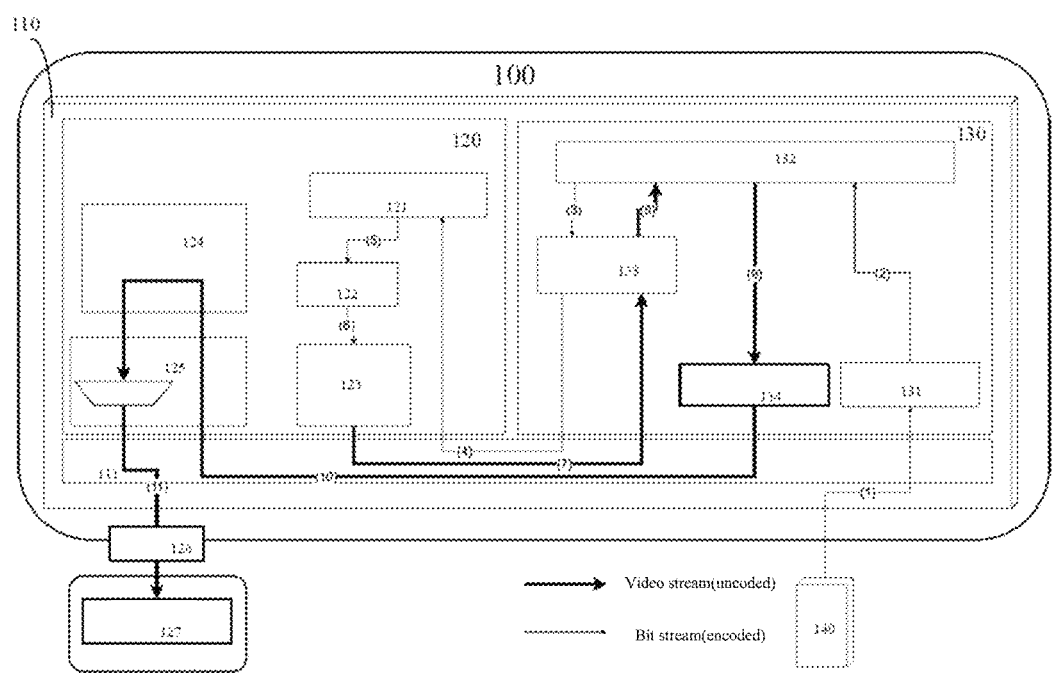
FIG. 1 shows a schematic diagram of an existing onboard screen casting system.

S1~S11 steps;
100, 400 in-vehicle infotainment unit;
110, 410 system-on-chip;
111, 411 virtual machine monitor;
120, 420 host system;
130, 430 virtual machine (guest) system;
121 virtual video codec service;
122, 422 video codec module;
123, 423 hardware decoder;
124, 424 virtual graphics card;
125, 425 display management module;
126, 426 serializer;
127, 427 first display module;
131, 431 USB/WiFi module;
132, 432 screen casting module;
133 virtual video codec client;
134, 434 second display module;
140, 440 mobile terminal;
210, 310 host system layer;
211, 311 startup animation layer;
212, 312 panoramic image layer;
220, 320 virtual machine system layer;
221, 321 navigation bar layer;
222, 322 volume pop-up layer;
223, 323 status bar layer;
224, 324 floating window layer;
225, 325 message prompt layer;
226, 326 application window layer;
227, 313 screen casting layer;
228, 327 wallpaper layers;
421 screen casting decoding module.

DETAILED DESCRIPTION OF EMBODIMENTS

The implementations of the present disclosure are described below by specific embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details are omitted in the description.

In the description of the present disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. The specific meaning of the above terms in the present disclosure can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

Figure 2:
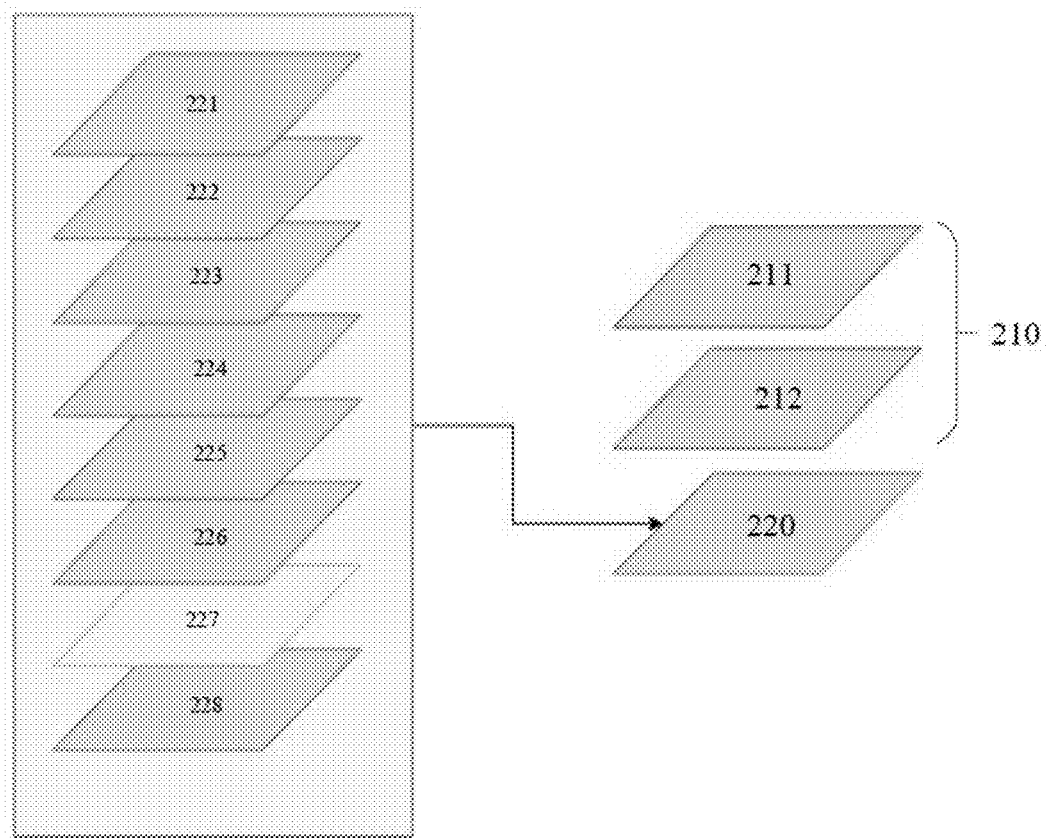
FIG. 2 shows a schematic diagram of layer management in a display management module in the onboard screen casting system shown in FIG. 1.

As mentioned above, with the development of technology, users have higher and higher requirements for real-time operation response. In the existing technology, an onboard host is developed based on a virtual machine monitor (hypervisor) to realize the functions of smartphone integrated systems such as Android Auto and Carplay. Please refer to FIGS. 1 and 2 for more details. FIG. 1 shows a schematic diagram of an existing onboard screen casting system. FIG. 2 shows a schematic diagram of layer management in a display management module in the onboard screen casting system shown in FIG. 1.

As shown in FIG. 1, the onboard screen casting system processes the screen casting video to be displayed as follows, where the transmission path of each data stream in FIG. 1 corresponds to each of the following steps:

Virtual Machine (Guest) System 130 End:

S1: A mobile terminal 140 (such as a mobile phone) sends a (encoded) bit stream data of a display data to be cast to the in-vehicle infotainment unit 100 of the vehicle through an USB/WiFi module 131.

S2: After receiving the bit stream data, the USB/WiFi module 131 on the vehicle sends the bit stream data to the screen casting module 132. The screen casting module 132 can be specifically configured as a screen casting APP, and the screen casting APP can include Carplay, Android Auto, Carlife, HiCar and other smartphone integrated functions.

S3: After receiving the data, the screen casting module 132 sends the bit stream data to a virtual video codec client 133 in the virtual machine (guest) system 130.

S4: The virtual video codec client 133 of the virtual machine (guest) system 130 sends the data to a virtual video codec service 121 in the host system 120.

Host System 120 End:

S5: The virtual video codec service 121 in the host system 120 calls a video codec module 122.

S6: The video codec module 122 in the host system 120 calls a hardware decoder 123 to decode the received (encoded) bit stream data into video stream data.

S7: The hardware decoder 123 transmits the video stream data back to the virtual video codec client 133 in the virtual machine (guest) system 130.

Virtual Machine (Guest) System 130 End:

S8: The virtual video codec client 133 in the virtual machine (guest) system 130 provides the video stream data to the screen casting module 132.

S9: The screen casting module 132 cuts and stretches the video stream data and then outputs it to a virtual second display module 134.

S10: The virtual second display module 134 sends the adjusted video stream data to a display management module 125 of the host system.

Host System 120 End:

S11: The display management module 125 of the host system 120 sends the video stream data to a first display module 127 of the host system 120 through a display channel.

It can be seen from the above processing flow of the screen cast video to be displayed that the hypervisor-based host system runs multiple operating systems, and each operating system has a need for displaying and video encoding and decoding, and the display driver and encoding and decoding resources are set to be shared, and hardware resource control is performed by the host system 120. Therefore, in order for the video stream data to be displayed on the first display module 127 of the host system 120, the video stream data needs to go through S4, S7, and S10, that means, multiple times of video transmission between the host system 120 and the virtual machine (guest) system between 130.

Furthermore, please refer to FIG. 2. The display management module 125 of the host system 120 includes a host system layer 210 and a virtual machine system layer 220. The casting layer 227 itself used to display the video data to be cast is set inside the virtual machine system layer 220. Therefore, if the video to be cast needs to be displayed on the host system 120, the decoded video stream data needs to be transmitted to the virtual machine (guest) system 130, and then virtually displayed on the casting layer 227 of the virtual machine system layer 220 managed by the virtual machine (guest) system 130, and finally transmitted back to the host system 120 for displaying the cast video on the onboard host. Therefore, architecture based on the existing solution will cause the video to be transmitted multiple times between the host system 120 and the virtual machine (guest) system 130, resulting in huge screen cast delay and resource waste.

In order to overcome the defects of the existing technology, the present disclosure provides an onboard screen casting system, an onboard screen casting method, and a computer-readable storage medium, reducing transmitting times of the data flow of the video to be cast between the host system and the virtual machine system without adding additional hardware equipment, to greatly reduce the screen casting delay.

In some non-limiting embodiments, the casting method provided in the embodiments of the present disclosure can be implemented through the casting system provided in the embodiments of the present disclosure, and the casting method can be implemented through the computer-readable storage medium provided in the embodiments of the present disclosure, The working principle of the above casting system will be described below in conjunction with some embodiments of casting methods. The embodiments of these casting methods only provide some non-limiting implementations of the present disclosure, which is intended to clearly display the main idea of the present disclosure, and provide some specific proposals that are convenient for the public to implement, rather than limiting all functions or all working modes of the casting system. Similarly, the casting system is only a non-limiting embodiment provided by the present disclosure, and does not limit the implementation subject to each step in these casting methods.

In some non-limiting embodiments, the onboard screen casting system provided in the embodiments of the present disclosure comprises a host system and a virtual machine system, wherein, the virtual machine system is able to receive external bit stream data to be cast and transmit it to the host system; and the host system is able to decode the bit stream data into video stream data, and perform a visibility setting on the video stream data, to display the corresponding video.

Figure 3:
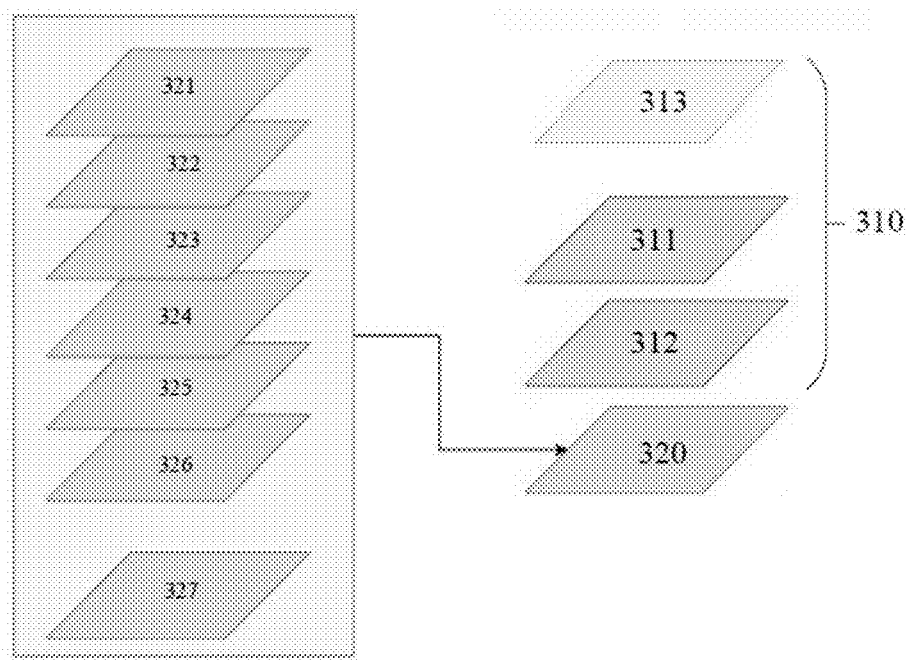
FIG. 3 shows a schematic diagram of layer management in an onboard screen casting system provided in accordance with some embodiments of the present disclosure.
Figure 4:
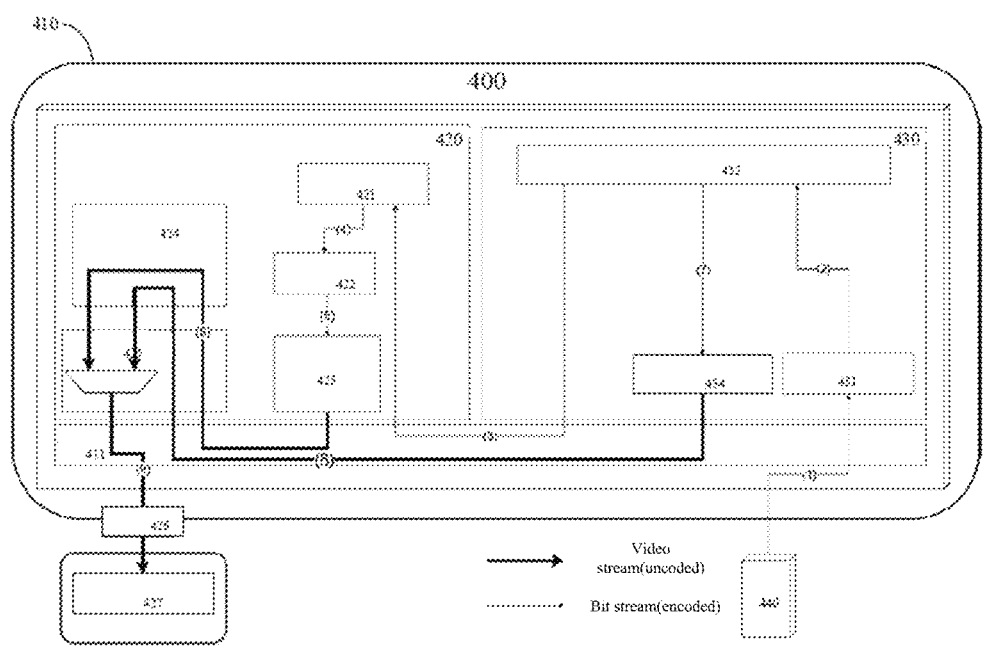
FIG. 4 shows a schematic diagram of the onboard screen casting system provided in accordance with some embodiments of the present disclosure.

Further, please refer to FIG. 3 and FIG. 4 in conjunction. FIG. 3 shows a schematic diagram of layer management in an onboard screen casting system provided in accordance with some embodiments of the present disclosure, and FIG. 4 shows a schematic diagram of the onboard screen casting system provided in accordance with some embodiments of the present disclosure.

As shown in FIG. 3 and FIG. 4, in some embodiments of the present disclosure, a host system 420 of the onboard screen casting system comprises a display management module 425. The display management module 425 comprises a host system layer 310 managed by the host system 420 and a virtual machine system layer 320 managed by a virtual machine (guest) system 430. In addition to a startup animation layer 311 and the panoramic image layer 312, the host system layer 310 adds a screen casting layer 313. Correspondingly, the screen casting layer originally set in the virtual machine system layer 320 is removed.

Based on hardware equipment of the above-mentioned host system 420 and the configuration of the above-mentioned screen casting layer 313, in some embodiments provided by the present disclosure, processing flow of the onboard screen casting system for the screen casting video to be displayed is as shown in FIG. 4, where transmission path of each data stream in FIG. 4 corresponds to each of the following steps:

Virtual Machine (Guest) System 430 End:

S1: A mobile terminal 440 (such as a mobile phone) sends a (encoded) bit stream data of the display data to be cast to the in-vehicle infotainment unit 400 through the USB/WiFi module 431.

S2: After receiving the bit stream data, the USB/WiFi module 431 on the vehicle sends the bit stream data to a screen casting module 432. The screen casting module 432 can be specifically set as a screen casting APP, and the screen casting APP includes Carplay, Android Auto, Carlife, HiCar and other smartphone integrated functions.

Host System 420 End:

S3: Add a screen casting decoding module 421 on the host system 420, where the screen casting decoding module 421 can be specifically configured as a screen casting decoding APP. When the screen casting decoding module 421 receives the bit stream data transmitted from the screen casting module 432 (i.e. the screen projection APP) of the virtual machine (guest) system 430, it can directly send the bit stream data to the screen casting decoding module 421 (i.e., screen projection decoding App) of the host system 420.

S4: The screen casting decoding module 421 calls a video decoding module 422.

S5: The video decoding module 422 of the host system 420 further calls a hardware decoder 423 to decode the (encoded) bit stream data into a video stream data, and performs a visibility setting on the video stream data.

The following two methods can be used to perform the visibility setting on the video stream data. In some embodiments, if the format of an output layer is an RGBA format, the video decoding module 422 can be used to perform the visibility setting on each pixel of the video stream data. In other words, for each pixel, whether it is visible can set based on the RGB value of the image. In some embodiments, "visibility setting" can be performed in the display management module 425. The display management module 425 has settings for whether each layer is visible or not. Please refer to step S6 for the specific process.

S6: While decoding the video stream data, the hardware decoder 423 performs size adjustment and then transmits it to the display management module 425.

Firstly, the decoded video stream data can also be performed the visibility setting in the display management module 425. Specifically, as shown in FIG. 3, the screen casting layer 313 in the display management module 425 is managed by the host system 420. When the cast video on the screen casting layer 313 is to be displayed, other layers in the host system layer 310, such as the startup animation layer 311 and the panoramic image layer 312, can be set to a transparent state, and the casting layer 313 is in a visible state to display the video on the casting layer 313, that is, the casting layer 313 in the host system 420 is what users watch at this time.

Further, the virtual machine system layer 320 in the display management module 425 can include at least one application layer, which can include, but not limited to, one or more of a navigation bar layer 321, a volume pop-up layer 322, a status bar layer 323, a floating window layer 324, a message prompt layer 325, an application window layer 326 and a wallpaper layer 327. When the video on the screen casting layer 313 needs to be displayed, the remaining layers in the display management module 425 except the screen casting layer 313 can be set to a transparent state, that is, other layers in the host system layer 310, for example, the startup animation layer 311, the panoramic image layer 312, and the above-mentioned application layers 321~327 in the virtual machine system layer 320 are all set to the transparent state, and all retreat to the background, and the screen casting layer 313 is in the visible state is presented to display the video on the screen casting layer 313, that is, the casting layer 313 of the host system 420 is what users watch at this time.

When the user wants to use other applications, such as using the panoramic image layer 312 of the host system layer 310, or using the navigation bar layer 321 of the virtual machine system layer 320, the layers related to the other applications can be to a non-transparent state, to make the screen casting layer 313 in an invisible state, to display the application screen on any of the application layers related to other applications mentioned above, that is, the other application layers of the host system 420 or the virtual machine (guest)system are what users watch at this time. By analogy, each layer can be switched to display.

In some embodiments, the virtual machine system layer 320 can include at least the above-mentioned multiple application layers, that is, application layers 321 to 327. When the user wants to display the application screen on the application layer and the video on the screen casting layer at the same time, the application screen to be displayed of the application layer can be set to a non-transparent state, to display the application screen, and the rest application layers which does not need to be displayed. are set to the transparent state, and the screen casting layer 313 is to the visible state, to display the video on the screen casting layer on the application screen in the transparent state. For example, if the user wants the application to display a notification and display the screen other than the notification as a screen casting, the user can set the message prompt layer 325 to a non-transparent state, and set the remaining application layers to a transparent state to display the video on the screen casting layer.

Further, in some embodiments, the screen casting layer 313 of the display management module 425 can be set below the virtual machine system layer 320. As shown in FIG. 3, the screen casting layer 313 and the virtual machine system layer 320 are set in this way. If there is a need to display applications such as navigation bars, volume pop-ups on the virtual machine system layer 320, it can be directly displayed on the upper layer without other special processing for the virtual machine system layer 320. Through reasonable configuration and control of each layer in the display management module 425, process of displaying each layer is simplified and time for calling layers is reduced, and such changes do not require modification of the overall display strategy of Android.

The above embodiments of visibility setting based on each layer in the display management module 425, or based on each pixel of the image in the video decoding module 422 are only two non-limiting implementations of the present disclosure, which is intended to clearly display the main idea of the present disclosure, and provide two specific solutions that are convenient for the public to implement, rather than limiting the protection scope of the present disclosure.

In the present disclosure, the size adjustment of the decoded video stream data can also have two ways. As mentioned above, one way is to directly stretch and/or cut the video stream data in the video decoding module 422 to perform size adjustment processing on the decoded video stream data.

In another way, processing can be performed in the display management module 425, to adjust the size of the screen casting layer 313 that displays the video stream data, to indirectly realize the size adjustment of the displayed video stream data.

Specifically, the screen casting layer 313 and at least one application layer (including other application layers in the host system layer 310 and the application layers 321-327 in the virtual machine system layer 320) of the display management module 425 can be merged, and the position and corresponding relationship of the merged two or more layers are set, to adjust the size of the screen casting layer 313. In this embodiment, the size adjustment of the screen casting layer 313 includes but not limited to operations such as cutting and stretching.

The above-mentioned solutions of adjusting the size of the video stream data directly based on the video decoding module 422, or adjusting the size of the video stream data indirectly based on the display management module 425 through layer merging, are only two non-limiting implementations of the present disclosure, which is intended to clearly display the main idea of the present disclosure, and provide two specific solutions that are convenient for the public to implement, rather than limiting the protection scope of the present disclosure.

Through S4, S5, and S6 in the above steps, it can be determined that in this process, the video stream data does not need to be retransmitted from the host system 420 back to the virtual machine (guest) system 430 for decoding, size adjustment and other data processing according to the existing processing method, thus saving the processing steps and processing time of S7, S8, S9, and S10 in the existing embodiments, which can save about 60 ms.

S7: The screen casting module 432 can also request a second display module 434 on the virtual machine (guest) system 430 to display a transparent screen.

Because the virtual machine (guest) system 430 is mainly used to display the application layer of the virtual machine system layer 320 of the display management module 425, when the host system 420 is required to display the screen casting layer 313 which the video to be cast is on, all the application layers in the virtual machine system layer 320 are all set to display a transparent screen on the virtual machine (guest) system 430 end. When there is no need to display the cast video, the virtual machine system layer 320 can be set to a non-transparent screen.

In some embodiments, the step S7 and the above-mentioned steps S3, S4, S5, and S6 can be performed at the same time, or multiple of them can be performed at the same time, for example, S4, S5, and S6 can be performed at the same time to further reduce the delay from video decoding to display.

S8: The second display module 434 is able to send data of other applications to the display management module 425, to merge the corresponding application layers to data of other application layer with the screen casting layer 313 corresponding to the video stream data obtained in the above step S6 after the visibility setting and/or size adjustment. This layer merging process can further adjust the size of the video stream data. Since this point has been introduced above and will not be repeated here.

In the some embodiment, as shown in FIG. 2, the merging of the screen casting layer 227 and other application layers is completed in the Android system on the virtual machine (guest) system 430 side. However, in the present disclosure, merging of the screen projecting layer 313 and other application layers is moved to the host system 420 side, which reduces the consumption of virtualization and can optimize performance by about 15%.

S9: The display management module 425 of the host system 420 is able to send the processed video stream data to the first display module 427 through a display channel, such as the GMSL serializer 426, to display the corresponding video externally.

In summary, the present disclosure provides an onboard screen casting system, an onboard screen casting method, and a computer-readable storage medium, reducing transmitting times of the data flow of the video to be cast between the host system and the virtual machine system without adding additional hardware equipment, to greatly reduce the screen casting delay.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

In some embodiments, signals and data can be represented using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

In some embodiments, various illustrative logic blocks, modules, circuits, and algorithm steps described in the embodiments disclosed herein can be implemented as electronic hardware, computer software, or a combination of both. In order to clearly explain the interchangeability of hardware and software, various illustrative components, blocks, modules, circuits, and steps are generally described above in the form of their functionality. Whether such functionality is implemented as hardware or software depends on the specific application and design constraints imposed on the overall system. Technicians can implement the described functionality in different ways for each specific application, but such implementation decisions should not be regarded as leading to departure from the scope of the disclosure.

Although the processing device described in the above embodiments can be implemented through a combination of software and hardware. However, it can be understood that the processing device can also be implemented separately in software or hardware. For hardware implementation, the processing device can be implemented in one or more application specific integrated circuits (ASICs), digital signal processors (DSPs), programmable logic devices (PLDs), field programmable gate arrays (FPGAs), processors, controllers, microcontrollers, microprocessors, other electronic devices used to perform the above functions, or a selected combination of the above devices. For software implementation, the processing device can be implemented through independent software modules such as procedures and functions running on a universal chip, and each module performs one or more of the functions and operations described in this article.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, microprocessors, one or more microprocessors cooperating with the DSP core or any other such configuration.

The previous description of the disclosure is provided to enable understanding of the disclosure. Various modifications to the disclosure will be apparent, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

What is claimed is:

1. An onboard screen casting system, comprising:
a host system; and
a virtual machine system;
wherein, the virtual machine system is able to receive external bit stream data to be cast and transmit it to the host system; and
the host system is able to decode the bit stream data into video stream data, and perform a visibility setting on the video stream data, to display the corresponding video;
wherein the host system comprises a display management module, and the display management module comprises a host system layer and a virtual machine system layer, wherein the host system comprises a screen casting layer, and the screen casting layer is located below the virtual machine system layer, wherein, the host system is able to perform the visibility setting on the video stream data on the screen casting layer, to display the video on the screen casting layer.

2. The onboard screen casting system according to claim 1, wherein the virtual machine system layer comprises at least one application layer, wherein,
the rest of layers other than the screen casting layer are set to be in a transparent state, and the screen casting layer is in a visible state, to display the video on the screen casting layer, or
the at least one application layer is set to be in a non-transparent state, and the screen casting layer is in an invisible state, to display an application screen on the at least one application layer.

3. The onboard screen casting system according to claim 2, wherein the at least one application layer comprises a plurality of application layers, wherein, one part of the application layers is set to be in the non-transparent state, to display the application screen on the application layer in the non-transparent state, and the other part of the application layers is set to be in the transparent state, to display the video on the screen casting layer on the application layer in the transparent state.

4. The onboard screen casting system according to claim 2, wherein the host system is further able to merge the screen casting layer and the at least one application layer, and set position and corresponding relations in the merged layer, to adjust the size of the screen casting layer.

5. The onboard screen casting system according to claim 1, wherein the host system comprises a video decoding module, and the video decoding module is able to perform visibility settings on each pixel of the video stream data, to perform visibility setting processing on the video stream data.

6. The onboard screen casting system according to claim 5, wherein the host system is able to stretch and/or cut the video stream data in the video decoding module.

7. The onboard screen casting system according to claim 1, wherein it further comprises a first display module, wherein the first display module is set in the host system, to at least display the video.

8. The onboard screen casting system according to claim 2, wherein it further comprises a first display module, wherein the first display module is set to be in the host system, to at least display the video.

9. The onboard screen casting system according to claim 2, wherein it further comprises a second display module, wherein the second display module is set to be in the virtual machine system, to at least display the application screen on the at least one application layer.

10. The onboard screen casting system according to claim 1, wherein it further comprises a screen casting module set in the virtual machine system and at least one decoding module set in the host system, wherein the screen casting module is able to receive the bit stream data to be cast from an external device and transmit the bit stream data to be cast to the at least one decoding module.

11. An onboard screen casting method, comprising:
receiving an external bit stream data to be cast via a virtual machine system and transmitting it to a host system; and
decoding the bit stream data into a video stream data via the host system, and performing a visibility setting on the video stream data, to display a corresponding video;
wherein the host system comprises a display management module, and the display management module comprises a host system layer and a virtual machine system layer, wherein the host system comprises a screen casting layer, and the screen casting layer is located below the virtual machine system layer, wherein, the host system is able to perform the visibility setting on the video stream data on the screen casting layer, to display the video on the screen casting layer.

12. A non-transitory computer-readable storage medium, in which computer instructions are stored, wherein when the computer instructions are executed by a processor, causes the processor to:
receive an external bit stream data to be cast via a virtual machine system and transmit it to a host system; and
decode the bit stream data into a video stream data via the host system, and perform a visibility setting on the video stream data, to display a corresponding video;
wherein the host system comprises a display management module, and the display management module comprises a host system layer and a virtual machine system layer, wherein the host system comprises a screen casting layer, and the screen casting layer is located below the virtual machine system layer, wherein, the host system is able to perform the visibility setting on the video stream data on the screen casting layer, to display the video on the screen casting layer.

* * * * *